(12) United States Patent
Kwon et al.

(10) Patent No.: US 9,327,983 B2
(45) Date of Patent: May 3, 2016

(54) COMPOSITIONS FOR PREPARING GRAPHENE AND METHODS FOR PREPARING GRAPHENE USING THE SAME

(71) Applicant: Hanwha Techwin Co., Ltd., Changwon-si (KR)

(72) Inventors: Yong Duck Kwon, Changwon-si (KR); Ki Soo Kim, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/669,528

(22) Filed: Mar. 26, 2015

(65) Prior Publication Data

US 2015/0197423 A1 Jul. 16, 2015

Related U.S. Application Data

(63) Continuation of application No. PCT/KR2014/002537, filed on Mar. 26, 2014.

(30) Foreign Application Priority Data

Jan. 6, 2014 (KR) ........................ 10-2014-0001500

(51) Int. Cl.
*H01B 1/04* (2006.01)
*C01B 31/04* (2006.01)
*B82Y 40/00* (2011.01)

(52) U.S. Cl.
CPC ......... *C01B 31/0453* (2013.01); *C01B 31/0484* (2013.01); *H01B 1/04* (2013.01)

(58) Field of Classification Search
CPC .................................. H01B 1/04; C01B 31/04
USPC ........... 252/500, 502, 510, 519.3; 423/445 R; 977/842, 847, 882, 895
See application file for complete search history.

(56) References Cited

U.S. PATENT DOCUMENTS

| | | | |
|---|---|---|---|
| 2003/0213553 A1* | 11/2003 | Bernards et al. | 156/281 |
| 2004/0112753 A1* | 6/2004 | Kesari et al. | 205/87 |
| 2011/0127471 A1 | 6/2011 | Shin et al. | |
| 2013/0130011 A1* | 5/2013 | Hong et al. | 428/220 |
| 2013/0217234 A1* | 8/2013 | Liu et al. | 438/702 |
| 2013/0309475 A1 | 11/2013 | Veerasamy | |
| 2014/0054550 A1* | 2/2014 | Hong et al. | 257/29 |
| 2014/0170852 A1* | 6/2014 | Noller et al. | 438/692 |
| 2015/0027978 A1* | 1/2015 | Barnes et al. | 216/13 |

FOREIGN PATENT DOCUMENTS

| | | | | |
|---|---|---|---|---|
| CN | 103101909 A | * | 5/2013 | ............ C01B 31/04 |
| KR | 10-2011-0061909 A | | 6/2011 | |
| KR | 10-2011-0095751 A | | 8/2011 | |
| KR | 10-2012-0012271 A | | 2/2012 | |
| KR | 10-2012-0013604 A | | 2/2012 | |
| KR | 10-2012-0073948 A | | 7/2012 | |
| KR | 10-2012-0080168 A | | 7/2012 | |
| KR | 10-2012-0099910 A | | 9/2012 | |
| KR | 10-2013-0096836 A | | 9/2013 | |
| KR | 10-2013-0110765 A | | 10/2013 | |

OTHER PUBLICATIONS

Nxumalo et al. ("The influence of nitrogen sources on nitrogen doped multi-walled carbon nanotubes." J of Organometallic Chem, 695, pp. 2596-2602, online Sep. 21, 2010).*
Search Report dated Oct. 2, 2014, issued by the International Searching Authority in counterpart International Application No. PCT/KR2014/002537.
Written Opinion dated Oct. 2, 2014, issued by the International Searching Authority in counterpart International Application No. PCT/KR2014/002537.

* cited by examiner

*Primary Examiner* — Tri V Nguyen
(74) *Attorney, Agent, or Firm* — Sughrue Mion, PLLC

(57) ABSTRACT

A composition for preparing a graphene and a method for preparing a graphene using the same are disclosed.

10 Claims, 3 Drawing Sheets

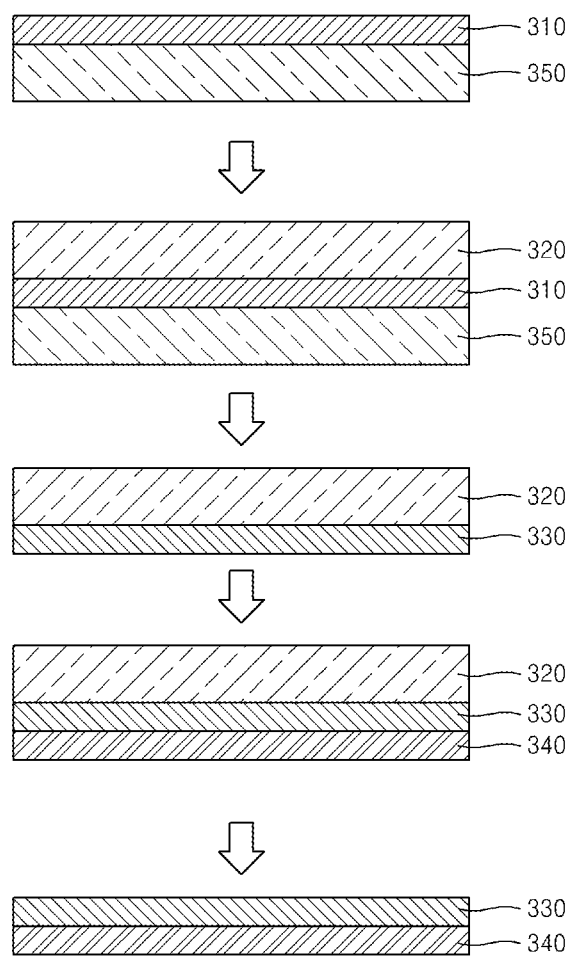

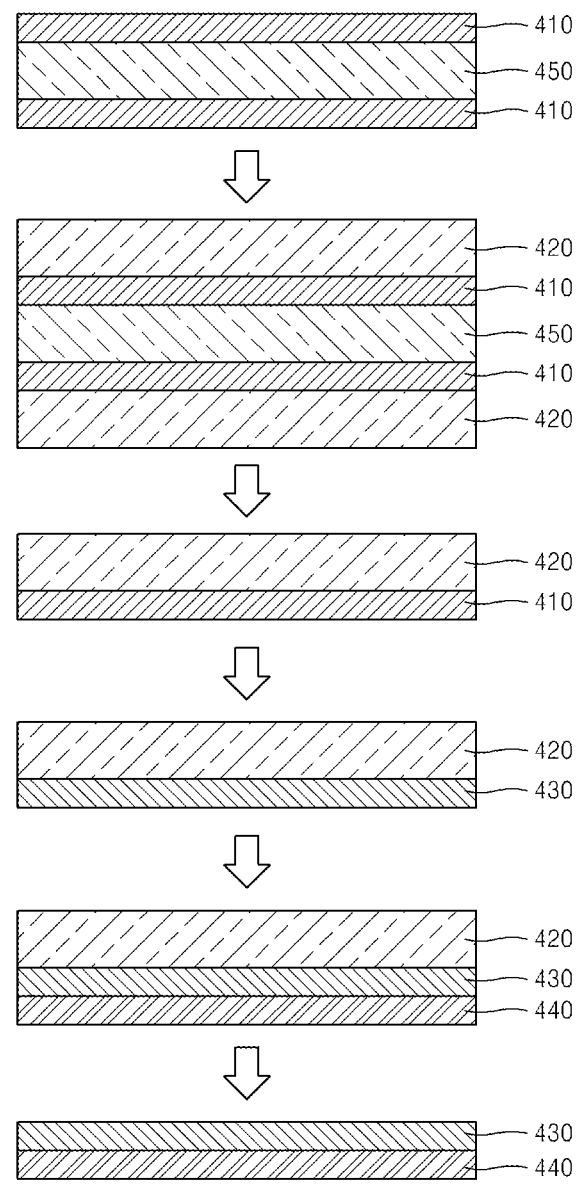

COMPOSITIONS FOR PREPARING GRAPHENE AND METHODS FOR PREPARING GRAPHENE USING THE SAME

RELATED APPLICATION

This application claims the benefit of Korean Patent Application No. 10-2014-0001500, filed on Jan. 6, 2014, in the Korean Intellectual Property Office, the disclosure of which is incorporated herein in its entirety by reference.

BACKGROUND

1. Field

One or more exemplary embodiments relate to compositions for preparing graphene and methods for preparing graphene using the same.

2. Description of the Related Art

Developments of new materials are actively being progressed in various electronic device fields such as display devices and solar cells. Particularly, studies are being actively progressed on new materials that are capable of replacing indium tin oxides (ITOs) mainly used as a transparent electrode of an electronic device. Studies are being intensively made on carbon-containing materials among the new materials, e.g., carbon nanotubes, diamond, graphite, graphene, etc.

Particularly, since graphene is excellent in terms of electric conductivity and transparency, various methods for preparing graphene have been suggested. The methods for preparing graphene may largely be divided into mechanical methods and chemical methods for preparing graphene. The mechanical methods for preparing graphene may include methods for detaching graphene from a graphite sample using a scotch tape. The chemical methods for preparing graphene may typically include a chemical vapor deposition (CVD) method. The CVD method is a method of injecting a vapor phased carbon supply source into a container in which a metal catalyst is disposed, heating the container, and then cooling the heated container again to grow a graphene sheet on the surface of the metal catalyst.

SUMMARY

One or more exemplary embodiments include a composition for preparing a graphene.

One or more exemplary embodiments include a method for preparing a graphene using the composition for preparing a graphene.

Additional aspects will be set forth in part in the description which follows and, in part, will be apparent from the description, or may be learned by practice of the presented embodiments.

According to one or more exemplary embodiments, a composition for preparing a graphene includes a nitrogen-containing organic compound represented by the following Formula 1 or 2, an oxidizer, and an acid:

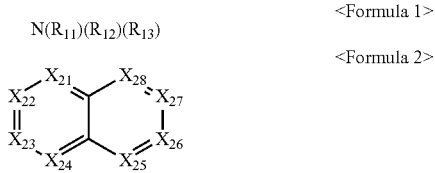

<Formula 1>
<Formula 2> wherein in Formulas 1 and 2, $X_{21}$ is N (nitrogen atom) or $CR_{21}$, $X_{22}$ is N or $CR_{22}$, $X_{23}$ is N or $CR_{23}$, $X_{24}$ is N or $CR_{24}$, $X_{25}$ is N or $CR_{25}$, $X_{26}$ is N or $CR_{26}$, $X_{27}$ is N or $CR_{27}$, and $X_{28}$ is N or $CR_{28}$; at least three of groups among $X_{21}$ to $X_{28}$ are selected as N; and $R_{11}$ to $R_{13}$ and $R_{21}$ to $R_{28}$ are each independently selected from hydrogen, a substituted or non-substituted $C_1$-$C_{60}$ alkyl, a substituted or non-substituted $C_3$-$C_{10}$ cycloalkyl, a substituted or non-substituted $C_6$-$C_{60}$ aryl, and a substituted or non-substituted $C_2$-$C_{60}$ heteroaryl.

According to one or more exemplary embodiments, a method for preparing a graphene includes doping a graphene with a composition for preparing a graphene to obtain a doped graphene, the composition for preparing a graphene including a nitrogen-containing organic compound represented by the following Formula 1 or 2, an oxidizer and an acid,

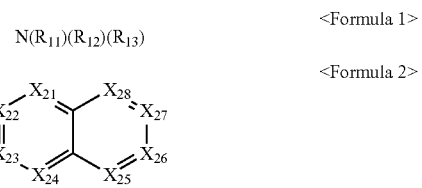

<Formula 1>
<Formula 2> wherein in Formula 1 and 2, $X_{21}$ is N (nitrogen atom) or $CR_{21}$, $X_{22}$ is N or $CR_{22}$, $X_{23}$ is N or $CR_{23}$, $X_{24}$ is N or $CR_{24}$, $X_{25}$ is N or $CR_{25}$, $X_{26}$ is N or $CR_{26}$, $X_{27}$ is N or $CR_{27}$, and $X_{28}$ is N or $CR_{28}$; at least three of groups among $X_{21}$ to $X_{28}$ are selected as N; and $R_{11}$ to $R_{13}$ and $R_{21}$ to $R_{28}$ are each independently selected from hydrogen, a substituted or non-substituted $C_1$-$C_{60}$ alkyl, a substituted or non-substituted $C_3$-$C_{10}$ cycloalkyl, a substituted or non-substituted $C_6$-$C_{60}$ aryl, and a substituted or non-substituted $C_2$-$C_{60}$ heteroaryl.

According to one or more exemplary embodiments, a method for preparing a graphene includes: forming a graphene on at least one side of a metal catalyst; and removing the metal catalyst and doping the graphene at the same time by using a composition for preparing a graphene to obtain a doped graphene, the composition for preparing a graphene including a nitrogen-containing organic compound represented by Formula 1 or 2, an oxidizer and an acid.

BRIEF DESCRIPTION OF THE DRAWINGS

These and/or other aspects will become apparent and more readily appreciated from the following description of the embodiments, taken in conjunction with the accompanying drawings in which:

FIG. 3 is a drawing schematically illustrating a preparation method of graphene according to another exemplary embodiment of the present disclosure; and FIG. 4 is a drawing schematically illustrating a preparation method of graphene according to a still another exemplary embodiment of the present disclosure.

DETAILED DESCRIPTION

Figure 1:
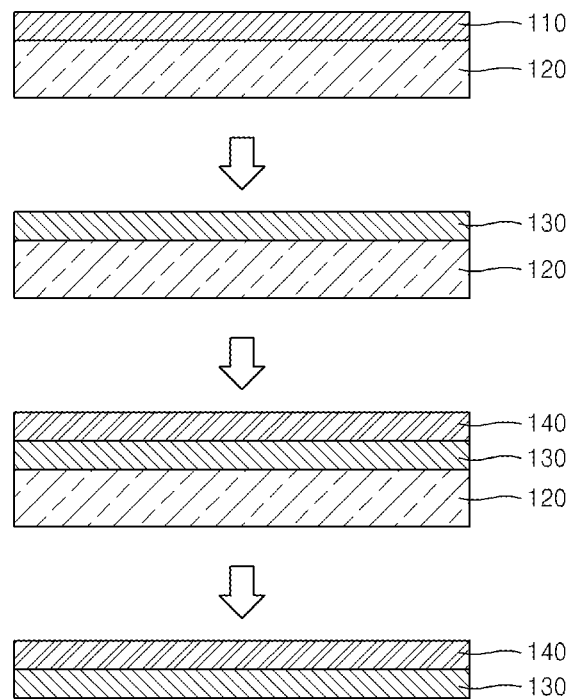
FIG. 1 is a drawing schematically illustrating a preparation method of graphene according to one exemplary embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a composition for preparing a graphene according to one exemplary embodiment of the present disclosure and a method for preparing a graphene using the composition for preparing a graphene are described more in detail.

In the present specification, "graphene" means that multiple carbon atoms are connected to one another by a covalent bond such that the carbon atoms are formed in a two-dimensional film form (normally $sp^2$ bond). Although the carbon atoms composing graphene form a 6-membered ring as a basic repeating unit, the carbon atoms can additionally include a 5-membered ring and/or a 7-membered ring. According to amount(s) of the 5-membered ring and/or the 7-membered ring that may be contained in graphene, the form of graphene may be varied. Although graphene may be formed in a single layer, multiple single layers may be laminated to form a multi-layer, and the layer of graphene may have a maximum thickness of about 100 nm.

In the present specification, "a composition for preparing a graphene" means a composition which removes a metal catalyst used in the preparation of graphene and/or which is used in doping graphene.

In the present specification, "a laminate" means multiple layers including graphene, i.e., a state of additionally including one or more of a metal catalyst, a carrier film, and a target film besides graphene depending on the respective steps of a method for preparing a graphene according to one or more exemplary embodiments of the present disclosure.

According to one exemplary embodiment of the present disclosure, a composition for preparing a graphene may include a nitrogen-containing organic compound represented by the following Formula 1 or 2, an oxidizer, and an acid:

$$N(R_{11})(R_{12})(R_{13}) \quad \text{<Formula 1>}$$

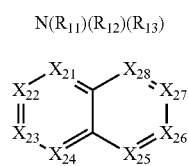

<Formula 2>

In Formula 2, $X_{21}$ is N (nitrogen atom) or $CR_{21}$, $X_{22}$ is N or $CR_{22}$, $X_{23}$ is N or $CR_{23}$, $X_{24}$ is N or $CR_{24}$, $X_{25}$ is N or $CR_{25}$, $X_{26}$ is N or $CR_{26}$, $X_{27}$ is N or $CR_{27}$, and $X_{28}$ is N or $CR_{28}$; and at least three of groups among $X_{21}$ to $X_{28}$ are selected as N.

For example, in Formula 2, although $X_{21}$ may be $CR_{21}$, $X_{22}$ may be $CR_{22}$, $X_{23}$ may be $CR_{23}$, $X_{24}$ may be $CR_{24}$, $X_{25}$ may be N, $X_{26}$ may be N, $X_{27}$ may be $CR_{27}$, and $X_{28}$ may be N, $X_{21}$ to $X_{28}$ are not limited thereto.

In Formulas 1 and 2, $R_{11}$ to $R_{13}$ and $R_{21}$ to $R_{28}$ may be each independently selected from hydrogen, a substituted or non-substituted $C_1$-$C_{60}$ alkyl, a substituted or non-substituted $C_3$-$C_{10}$ cycloalkyl, a substituted or non-substituted $C_6$-$C_{60}$ aryl, and a substituted or non-substituted $C_2$-$C_{60}$ heteroaryl.

For example, in Formulas 1 and 2, $R_{11}$ to $R_{13}$ and $R_{21}$ to $R_{28}$ may be each independently selected from hydrogen, methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl; and methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl which are substituted by at least one selected from the group consisting of deuterium, halogen atom, cyano, nitro, methyl, ethyl, n-propyl, iso-propyl, n-butyl, sec-butyl, iso-butyl, tert-butyl, phenyl, naphthyl, and pyridinyl. However, $R_{11}$ to $R_{13}$ and $R_{21}$ to $R_{28}$ are not limited thereto.

For other example, in Formula 1, $R_{11}$ to $R_{13}$ may be each independently selected from hydrogen, methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl; and $R_{11}$, $R_{12}$ and $R_{13}$ may not be hydrogen at the same time. However, $R_{11}$, $R_{12}$ and $R_{13}$ are not limited thereto.

For example, although a nitrogen-containing organic compound represented by Formula 2 may be represented by the following Formula 2A, the nitrogen-containing organic compound is not limited thereto:

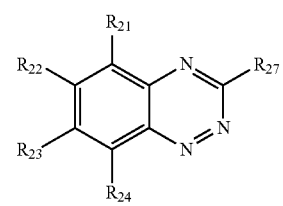

<Formula 2A> wherein $R_{21}$ to $R_{24}$ and $R_{27}$ may be the same as described above.

In another example, when a nitrogen-containing compound represented by Formula 2 is represented by Formula 2A, $R_{21}$ to $R_{24}$ and $R_{27}$ may be each independently selected from hydrogen, methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl; and methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl which are substituted by at least one selected from the group consisting of deuterium, halogen atom, cyano, nitro, methyl, ethyl, n-propyl, iso-propyl, n-butyl, sec-butyl, iso-butyl, tert-butyl, phenyl, naphthyl, and pyridinyl. However, $R_{21}$ to $R_{24}$ and $R_{27}$ are not limited thereto.

For example, the nitrogen-containing organic compound represented by Formula 1 or 2 may be selected from 1-aminobutane, 2-amino-2-methylpropane, 1-methylaminopropane, dimethylaminoethane, cyclohexylamine, and 1,2,4-benzotriazine. However, the nitrogen-containing organic compound is not limited thereto.

When a composition including acid together with the nitrogen-containing organic compound represented by Formula 1 or 2 is used to graphene, a sheet resistance value of graphene may be lowered. For example, when a composition which includes the nitrogen-containing organic compound represented by Formula 1 or 2, but does not include an acid is used to graphene, the sheet resistance value of graphene is not lowered. Namely, when a composition only including the nitrogen-containing organic compound represented by Formula 1 or 2 is used to graphene, graphene cannot be doped.

Although the oxidizer may be one or more selected from $H_2O_2$, $(NH_4)S_2O_8$, $HClO$ and $HClO_4$, the oxidizer is not limited thereto. For example, the oxidizer may be $H_2O_2$. Further, the oxidizer may be introduced into the composition for preparing a graphene in a solid form, or in a state that the oxidizer is diluted into a solvent such as water.

Although the acid may be one or more selected from $H_2SO_4$, $HNO_3$, $H_3PO_4$, $HCl$, $HCOOH$, and $CH_3COOH$, the acid is not limited thereto. The acid may be introduced into the composition for preparing a graphene in a state that the acid is diluted into a solvent such as water. For example, the acid may be about 95% by weight of an aqueous sulfuric acid solution or about 85% by weight of an aqueous phosphoric acid solution.

The composition for preparing a graphene may additionally include copper (I) ion or copper (II) ion. If copper-sources added to the composition for preparing a graphene provide copper (I) ion or copper (II) ion, forms of the copper-sources are not limited. For example, a copper-source in a copper salt form such as $CuCl_2$ or $CuCl$ may be added to the composition for preparing a graphene.

The composition for preparing a graphene may include about 0.2% by weight to about 10% by weight of the nitrogen-containing organic compound represented by Formula 1 or 2, about 1% by weight to about 10% by weight of an oxidizer, about 2% by weight to about 30% by weight of an acid, and a balance of a solvent. However, the composition for preparing a graphene is not limited thereto. In the present specification, contents of the nitrogen-containing organic compound, oxidizer, and acid are based on the total composition for preparing a graphene weight.

For example, although the composition for preparing a graphene may include about 0.5% by weight or more, 1% by weight or more, about 2.5% by weight or less, or about 2% by weight or less of the nitrogen-containing organic compound represented by Formula 1 or 2, the composition for preparing a graphene is not limited thereto.

For example, although the composition for preparing a graphene may include about 2% by weight or more, 3% by weight or more, about 9% by weight or less, or about 8% by weight or less of the oxidizer, the composition for preparing a graphene is not limited thereto.

For example, although the composition for preparing a graphene may include about 3% by weight or more, 5% by weight or more, about 18% by weight or less, or about 15% by weight or less of the acid, the composition for preparing a graphene is not limited thereto.

The composition for preparing a graphene may include about 0.2% by weight to about 3% by weight of a nitrogen-containing organic compound, about 1% by weight to about 5% by weight of an oxidizer, about 2% by weight to about 10% by weight of an acid, about 0.1% by weight to about 1.0% by weight of copper (I) ion or copper (II) ion, and a balance of a solvent. However, the composition for preparing a graphene is not limited thereto.

For example, the composition for preparing a graphene may include about 0.2% by weight or more, 0.5% by weight or less, or 0.4% by weight or less of copper (I) ion or copper (II) ion. However, the composition for preparing a graphene is not limited thereto. The composition for preparing a graphene may additionally include copper (I) ion or copper (II) ion at the time of graphene preparation such that the composition includes about 3 g/L of the copper (I) ion or copper (II) ion at the time of preparing a graphene. However, the composition for preparing a graphene is not limited thereto.

Water may be used as a solvent of the composition for preparing a graphene. That is, the composition for preparing a graphene may be an aqueous solution of a nitrogen-containing organic compound, an oxidizer, and an acid. However, the solvent of the composition for preparing a graphene is not limited to water, but the materials are not particularly limited if the solvent includes any materials that are capable of homogeneously dispersing the oxidizer and acid. Therefore, the solvent may additionally include other liquids that are compatible with water besides water. Further, the solvent may additionally include an organic solvent such as tetrahydrofuran to disperse the nitrogen-containing organic compound homogeneously.

The composition for preparing a graphene may additionally include additives. The additives may be additives known in a technical field to which the present disclosure belongs. For example, the additives include a dispersant, a storage stabilizer, a stabilizer, and mixtures thereof. The additives may be contained in amount ranges of about 3% by weight to about 20% by weight based on the total weight of the composition for preparing a graphene.

The nitrogen-containing organic compound represented by Formula 1 or 2, the oxidizer, the acid and the solvent are mixed in-situ such that the mixture may be used as the composition for preparing a graphene. However, after mixing the nitrogen-containing organic compound represented by Formula 1 or 2, the oxidizer, the acid and the solvent to prepare a composition, the prepared composition is stored and used. Particularly when the prepared composition is stored and used after mixing the nitrogen-containing organic compound represented by Formula 1 or 2, the oxidizer, the acid and the solvent to prepare a composition, the composition for preparing a graphene may additionally include additives such as a dispersant, a storage stabilizer, etc. Further, when the composition for preparing a graphene includes $H_2O_2$ as the oxidizer, the composition for preparing graphene may additionally include additives such as a stabilizer for controlling the oxidation reaction of $H_2O_2$.

The nitrogen-containing organic compound represented by Formula 1 or 2 may be a dopant included in graphene. The nitrogen-containing organic compound represented by Formula 1 or 2 may be chemically and/or physically bonded to the surface of graphene, and may be chemically and/or physically bonded between multiple layers composing graphene. However, the nitrogen-containing organic compound represented by Formula 1 or 2 is not limited thereto. Namely, if a sheet resistance value of graphene may be lowered, bonding positions or bonding methods of the nitrogen-containing organic compound represented by Formula 1 or 2 are not limited.

Although a sheet resistance value of graphene may be lowered when doping graphene using a metal salt such as $AuCl_3$, transmittance of graphene may be lowered. Meanwhile, when doping graphene using an acid such as $HNO_3$, the sheet resistance value of graphene may be lowered, and transmittance of graphene may also be maintained. However, such doping effects may not be lasted for a long time.

However, when doping graphene using the nitrogen-containing organic compound represented by Formula 1 or 2, the sheet resistance value of graphene may be lowered, the transmittance of graphene may be maintained, and the lowered sheet resistance value of graphene may be maintained for a long time.

Graphene doped with the nitrogen-containing organic compound represented by Formula 1 or 2 has a sheet resistance value of about more than 0 Ω/sq to about 300 Ω/sq or less, e.g., about 100 Ω/sq to about 200 Ω/sq.

Although a graphene doped with the nitrogen-containing organic compound represented by Formula 1 or 2 according to one exemplary embodiment of the present disclosure may be used to replace an existing ITO electrode, the graphene doped with the nitrogen-containing organic compound represented by Formula 1 or 2 is not limited thereto. Specifically, the graphene may be used as a transparent electrode. More specifically, the graphene may be used as a transparent electrode for touch panels. Further, specifically, the graphene may be used as an electrode for solar cells.

FIG. 1 is a drawing schematically illustrating one exemplary embodiment of a preparation method of graphene. Hereinafter, referring to FIG. 1, a preparation method of graphene according to one exemplary embodiment of the present disclosure is described as follows.

A carrier film 120 is bonded to one side of graphene 110.

If the carrier film 120 includes types of the carrier film 120 that support a graphene 110 to facilitate transfer of the graphene 110, maintain the shape of the graphene 110, and can prevent damages of the graphene 110, the types of the carrier film 120 are not limited. For example, the carrier film 120 may be thermal release tape or a polymer support, the carrier film 120 is not limited thereto. Although one side of the thermal release tape has adhesive property at room temperature, the thermal release tape has properties of loosing adhesive property at a predetermined temperature or higher. The polymer support includes polymers such as polymethylmethacrylate (PMMA), etc., and the polymer may be removed by an organic solvent at a desired time after forming a polymer on one side of the graphene 110 by a solution process.

A laminate of the graphene 110 and the carrier film 120 is doped with a composition for preparing graphene including the nitrogen-containing organic compound represented by Formula 1 or 2, the oxidizer, and the acid to obtain a doped graphene 130.

Functions, types, using forms, contents, etc of the nitrogen-containing organic compound represented by Formula 1 or 2, the oxidizer, and the acid are referred to the above-mentioned composition for preparing graphene.

If the step of obtaining the doped graphene 130 is a method that is capable of obtaining the doped graphene, forms of the step are not limited. For example, the step may be made by impregnating the laminate of the graphene 110 and the carrier film 120 with the composition for preparing graphene or by spraying the composition for preparing graphene onto the laminate of the graphene 110 and the carrier film 120. The step of obtaining the doped graphene 130 may be progressed for about 3 minutes to about 60 minutes. For example, the composition for preparing graphene is capable of doping the graphene 110 within a time range of about 3 minutes to about 60 minutes, e.g., about 3 minutes to about 15 minutes, or about 5 minutes to about 10 minutes. Since the graphene 110 may be sufficiently doped when applying a time range of about 3 minutes to about 60 minutes, a sheet resistance value of the doped graphene 130 obtained may be lowered to the maximum. A time range of using the composition for preparing graphene may be appropriately controlled according to circumstances.

The doped graphene 130 is transferred onto a target film 140.

The target film 140 may be a portion of a device to which the doped graphene 130 is applied, and specifically may be a one surface of an electrode of the device.

In order to transfer the doped graphene 130 onto the target film 140, after the laminate of the graphene 110 and the carrier film 120 is bonded to the target film 140, the carrier film 120 is removed. For example, when the carrier film 120 is thermal release tape, the thermal release tape is detached from the doped graphene 130 by applying a force to the doped graphene 130 at a predetermined temperature or higher at which the thermal release tape looses adhesive property. For example, when the carrier film 120 is a polymer support, an organic solvent such as acetone is applied to the polymer support to remove the polymer support from the doped graphene 130.

Figure 2:
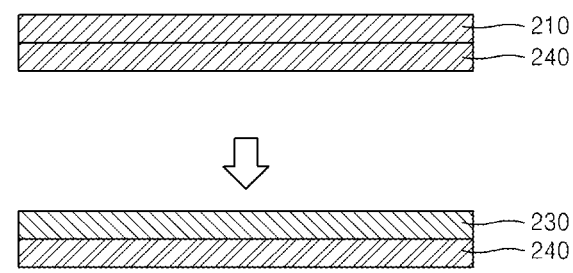
FIG. 2 is a drawing schematically illustrating a preparation method of graphene according to other exemplary embodiment of the present disclosure.

FIG. 2 is a drawing schematically illustrating other exemplary embodiment of a preparation method of graphene. Hereinafter, referring to FIG. 2, a preparation method of graphene according to one exemplary embodiment of the present disclosure is described as follows.

A target film 240 is bonded to one side of graphene 210.

Description of the target film 240 is referred to the description of the target film 140 of FIG. 1.

A laminate of the graphene 210 and the target film 240 is doped with a composition for preparing graphene including a nitrogen-containing organic compound, an oxidizer, and an acid to obtain a doped graphene 230.

Functions, types, using forms, contents, etc of the nitrogen-containing organic compound, the oxidizer, and the acid are referred to the above-mentioned composition for preparing graphene.

A description on the step of obtaining the doped graphene 230 is referred to the description on the step of obtaining the doped graphene 130 of FIG. 1.

FIG. 3 is a drawing schematically illustrating another exemplary embodiment of a preparation method of graphene. Hereinafter, referring to FIG. 3, a preparation method of graphene according to one exemplary embodiment of the present disclosure is described as follows.

Although it is not illustrated in the drawing, a metal catalyst 350 is pretreated.

The metal catalyst 350 may be used as a place at which a graphene is grown. Forms of the metal catalyst 350 are not limited if the graphene is grown at the metal catalyst 350. For example, the metal catalyst 350 may be a sheet, a substrate, or a film.

Although the metal catalyst 350 may be one or more selected from copper (Cu), nickel (Ni), cobalt (Co), iron (Fe), platinum (Pt), gold (Au), silver (Ag), aluminum (Al), chromium (Cr), magnesium (Mg), manganese (Mn), molybdenum (Mo), rhodium (Rh), silicon (Si), tantalum (Ta), titanium (Ti), tungsten (W), uranium (U), vanadium (V), palladium (Pd), yttrium (Y), zirconium (Zr), germanium (Ge) and alloys thereof, the metal catalyst 350 is not limited thereto.

The metal catalyst 350 may be a single layer, or may be an outermost layer of a multilayer substrate consisting of two or more layers.

A hydrogen gas may be used in a process of pretreating the metal catalyst 350 to remove foreign materials existing on the surface of the metal catalyst 350. Further, the process of pretreating the metal catalyst 350 may reduce defects of graphene during the formation of graphene by cleaning the surface of the metal catalyst 350 using an acid, an alkali solution, etc. The process of cleaning the surface of the metal catalyst 350 may be omitted as occasion demands.

A graphene 310 is formed on at least one side of the metal catalyst 350.

The step of forming the graphene 310 on the at least one side of the metal catalyst 350 is not limited to a particular method. For example, various processes such as chemical vapor deposition (CVD), thermal chemical vapor deposition (TCVD), rapid thermal chemical vapor deposition (RTCVD), inductive coupled plasma chemical vapor deposition (ICP-CVD), atomic layer deposition (ATLD), etc may be used in the step. Nonlimiting examples of the step may include CVD.

CVD is a method of growing a graphene sheet on the surface of the metal catalyst by cooling the heated container again after injecting a vapor phased carbon supply source into a container in which a metal catalyst is disposed and heating the container.

The vapor phased carbon supply source may be carbon monoxide, ethane, ethylene, ethanol, acetylene, propane, butane, butadiene, pentane, pentene, cyclopentadien, hexane, cyclohexane, benzene, toluene, or mixtures of two or more thereof. Such a vapor phased carbon supply source is separated into carbon atoms and hydrogen atoms at high temperatures. The separated carbon atoms are deposited onto the heated metal catalyst 350, and a graphene 310 is formed while the metal catalyst 350 is being cooled.

The graphene 310 may be formed on at least side of the metal catalyst 350. Although the graphene 310 may be formed on one side of the metal catalyst 350 as in one exemplary embodiment of the present disclosure illustrated in FIG. 3, the formation of the graphene 310 is not limited thereto, but the graphene 310 may also be formed on both sides of the metal catalyst 350.

A carrier film 320 is formed on one side of the graphene 310 which is not equipped with the metal catalyst 350.

A description on the carrier film 320 is referred to the description on the carrier film 120 of FIG. 1.

A doped graphene 330 is obtained by applying a composition for preparing graphene including a nitrogen-containing organic compound, an oxidizer and an acid to a laminate of a carrier film 320, a graphene 310 and a metal catalyst 350, thereby removing the metal catalyst 350 and doping the graphene 310 at the same time.

The doped graphene 330 may be economically prepared since the metal catalyst 350 is removed, and the graphene 330 is doped at the same time. Namely, a cost for preparing the doped graphene is reduced since the method can omit a preparation process of one step compared to a method of removing the metal catalyst and then doping the graphene. Further, a lowered sheet resistance value of the doped graphene 330 may be maintained for a long time by using the composition for preparing graphene.

The step of simultaneously removing the metal catalyst 350 and doping the graphene 310 to obtain the doped graphene 330 may be performed for about 3 minutes to about 60 minutes. For example, the composition for preparing graphene may simultaneously remove the metal catalyst 350 and dope the graphene 310 within a time range of about 3 minutes to about 60 minutes, e.g., about 3 minutes to about 15 minutes, or about 5 minutes to about 10 minutes. Since the graphene 310 may be sufficiently doped while the metal catalyst 350 is substantially completely removed when applying a time range of about 3 minutes to about 60 minutes, a sheet resistance value of the doped graphene 330 obtained may be lowered to the maximum. A time range of using the composition for preparing graphene may be appropriately controlled according to circumstances.

The composition for preparing graphene may be used in an amount of about 500 mL to about 1,000 mL per about 50 g of the metal catalyst 250.

The doped graphene 330 is transferred onto a target film 340.

In order to transfer the doped graphene 330 onto the target film 340, a method of bonding a laminate of the graphene 310 and the carrier film 320 to the target film 340 is referred to the description of FIG. 1.

A description on the target film 340 is referred to the target film 140 of FIG. 1.

FIG. 4 is a drawing schematically illustrating another exemplary embodiment of a preparation method of graphene. Hereinafter, referring to FIG. 4, a preparation method of graphene according to one exemplary embodiment of the present disclosure is described as follows.

Although it is not illustrated in the drawing, a metal catalyst 450 is pretreated.

A description on the step of pretreating the metal catalyst 450 is referred to the description on the step of pretreating the metal catalyst 350 of FIG. 3.

A graphene 410 is formed on at least one side of the metal catalyst 450.

A description on the step of forming the graphene 410 on the at least one side of the metal catalyst 450 is referred to the description on the step of forming the graphene 310 on the at least one side of the metal catalyst 350 of FIG. 3.

The graphene 410 may be formed on at least side of the metal catalyst 450. Although the graphene 410 may be formed on both sides of the metal catalyst 450 as in one exemplary embodiment of the present disclosure illustrated in FIG. 4, the formation of the graphene 410 is not limited thereto, but the graphene 410 may also be formed on one side of the metal catalyst 450.

A carrier film 420 is formed on one side of the graphene 410 which is not equipped with the metal catalyst 450.

A description on the carrier film 420 is referred to the description on the carrier film 120 of FIG. 1.

The metal catalyst 450 is removed.

The step of removing the metal catalyst 450 is not limited to a particular method. For example, the step of removing the metal catalyst 450 may be performed by an electrochemical separation method.

The electrochemical separation method is a method of separating the graphene from the metal catalyst by immersing a laminate of a metal catalyst and a graphene into an electrolyte solution and applying a voltage to the laminate. The electrochemical separation method is used to separate a graphene formed on both sides of the metal catalyst such that all of the separated graphene can be used.

Although examples of the electrolyte solution may include one or more selected from NaOH, $Na_2CO_3$, $Na_3PO_4$, $Na_2SiO_3$ and sodium silicate, the electrolyte solution is not limited to the examples.

Although the voltage may be about 3 V to about 30 V, the voltage is not limited thereto.

A composition for preparing graphene including a nitrogen-containing organic compound, an oxidizer and an acid is applied to a laminate of the carrier film 420 and the graphene 410, and the graphene 410 is doped with the composition for preparing graphene to obtain a doped graphene 230.

The composition for preparing graphene is used such that a lowered sheet resistance value of the doped graphene 430 may be maintained for a long time.

A description on the step of doping the graphene 410 to obtain the doped graphene 430 is referred to the description on the step of doping the graphene 110 to obtain the doped graphene 130 of FIG. 1.

The doped graphene 430 is transferred onto a target film 440.

In order to transfer the doped graphene 430 onto the target film 440, a method of bonding the laminate of the graphene 410 and the carrier film 420 to the target film 440 is referred to the description of FIG. 1.

A description on the target film 440 is referred to the target film 140 of FIG. 1.

Although methods for preparing a graphene have been described referring to FIGS. 1 to 4, a method for preparing graphene of the present disclosure is not limited thereto.

Hereinafter, exemplary embodiments of the present disclosure are described more in detail through the following Examples and Comparative Example. However, such embodiments are provided for illustrative purposes only, and the scope of the present invention should not be limited thereto in any manner. Further, it should be understood that the present disclosure is not limited to the above descriptions since other various modifications of the present disclosure may occur to persons having ordinary knowledge in the related art of the present disclosure.

Example 1

A copper (Cu) plate of about 35° C. was charged into a CVD furnace. After flowing $CH_4$ into the furnace in a flow rate of about 30 standard cubic centimeters per minute (sccm) at about 1,000° C. for about 5 minutes, the Cu plate was cooled to about 600° C. in a cooling rate of about 60° C./min and then cooled to about room temperature in a cooling rate of about 40° C./min in a $H_2$ atmosphere such that a graphene was formed on Cu.

A laminate of Cu and graphene was immersed into an aqueous 4 wt. % $(NH_4)S_2O_8$ solution for about 120 minutes such that Cu was removed to obtain a graphene.

The obtained graphene was immersed into a composition including about 3% by weight of 1,2,4-benzotriazine, about 3% by weight of $H_2O_2$, about 9% by weight of $H_2SO_4$ and a balance of water for about 40 minutes such that a doped graphene was obtained.

Example 2

A copper (Cu) plate of about 35° C. was charged into a CVD furnace. After flowing $CH_4$ into the furnace in a flow rate of about 30 sccm at about 1,000° C. for about 5 minutes, the Cu plate was cooled to about 600° C. in a cooling rate of about 60° C./min and then cooled to about room temperature in a cooling rate of about 40° C./min in a $H_2$ atmosphere such that a graphene was formed on Cu.

A laminate of Cu and graphene was immersed into an aqueous 9 wt. % sulfuric acid solution for about 40 minutes such that Cu was removed to obtain a graphene.

The obtained graphene was immersed into a composition including about 3% by weight of 1,2,4-benzotriazine, about 3% by weight of $H_2O_2$, about 9% by weight of $H_2SO_4$ and a balance of water for about 10 minutes such that a doped graphene was obtained.

Example 3

A copper (Cu) plate of about 35° C. was charged into a CVD furnace. After flowing $CH_4$ into the furnace in a flow rate of about 30 sccm at about 1,000° C. for about 5 minutes, the Cu plate was cooled to about 600° C. in a cooling rate of about 60° C./min and then cooled to about room temperature in a cooling rate of about 40° C./min in a $H_2$ atmosphere such that a graphene was formed on Cu.

A laminate of Cu and graphene was immersed into a composition including about 3% by weight of 1,2,4-benzotriazine, about 3% by weight of $H_2O_2$, about 9% by weight of $H_2SO_4$ and a balance of water for about 40 minutes such that Cu was removed, and the graphene was doped at the same time to obtain a doped graphene.

Example 4

A copper (Cu) plate of about 35° C. was charged into a CVD furnace. After flowing $CH_4$ into the furnace in a flow rate of about 30 sccm at about 1,000° C. for about 5 minutes, the Cu plate was cooled to about 600° C. in a cooling rate of about 60° C./min and then cooled to about room temperature in a cooling rate of about 40° C./min in a $H_2$ atmosphere such that a graphene was formed on Cu.

A laminate of Cu and graphene was immersed into an aqueous 4 wt. % $(NH_4)S_2O_8$ solution for about 120 minutes such that Cu was removed to obtain a graphene.

The obtained graphene was immersed into a composition including about 3% by weight of 1,2,4-benzotriazine, about 3% by weight of $H_2O_2$, about 9% by weight of $H_2SO_4$, about 0.3% by weight of $CuCl_2$ and a balance of water for about 60 minutes such that a doped graphene was obtained.

Comparative Example

A copper (Cu) plate of about 35° C. was charged into a CVD furnace. After flowing $CH_4$ into the furnace in a flow rate of about 30 standard cubic centimeters per minute (sccm) at about 1,000° C. for about 5 minutes, the Cu plate was cooled to about 600° C. in a cooling rate of about 60° C./min and then cooled to about room temperature in a cooling rate of about 40° C./min in a $H_2$ atmosphere such that a graphene was formed on Cu.

A laminate of Cu and graphene was immersed into an aqueous 4 wt. % $(NH_4)S_2O_8$ solution for about 120 minutes such that Cu was removed to obtain a graphene.

The obtained graphene was vapor-doped with about 70% by weight of $HNO_3$ for about 3 minutes such that a doped graphene was obtained.

Evaluation Example

Sheet resistance values of graphenes prepared in Examples 1 to 4 and the comparative example and changes in the sheet resistance values over time were measured.

The sheet resistance values are average values for sheet resistance values measured at about 143 measuring points that are automatically selected using an automatic sheet resistance meter that is obtainable from Dasol ENG.

TABLE 1

|  | Right after doping | One day after doping | Two days after doping | Three days after doping | Four days after doping | Five days after doping |
|---|---|---|---|---|---|---|
| Example 1 ($\Omega$/sq) | 210 | 213 | 214 | 213 | 213 | 215 |
| Example 2 ($\Omega$/sq) | 208 | 208 | 208 | 209 | 210 | 211 |
| Example 3 ($\Omega$/sq) | 210 | 215 | 215 | 216 | 215 | 215 |

TABLE 1-continued

| | Right after doping | One day after doping | Two days after doping | Three days after doping | Four days after doping | Five days after doping |
|---|---|---|---|---|---|---|
| Example 4 (Ω/sq) | 210 | 213 | 213 | 214 | 214 | 214 |
| Comparative Example (Ω/sq) | 289 | 409 | 460 | 479 | 488 | 493 |

It was confirmed by referring to Table 1 that sheet resistance values of the graphenes could be lowered by using a composition including a nitrogen-containing organic compound represented by Formula 1 or 2, an oxidizer and an acid, thereby doping graphenes with the nitrogen-containing organic compound. Further, it can be confirmed that the sheet resistance values of the graphenes can also be lowered by removing the metal catalyst and doping the graphenes at the same time.

It can be confirmed by referring to Table 1 that the lowered sheet resistance values of the graphenes are maintained for a long time when using the composition including the nitrogen-containing organic compound represented by Formula 1 or 2, the oxidizer, and the acid.

As described above, according to the one or more of the above exemplary embodiments, a composition for preparing graphene that is capable of preparing graphene having a low sheet resistance value and a long holding time of the low sheet resistance value and a method for preparing graphene using the composition for preparing graphene may be provided.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A composition for preparing a graphene comprising:
   a nitrogen-containing organic compound represented by the following Formula 2;
   an oxidizer; and
   an acid:

$N(R_{11})(R_{12})(R_{13})$  <Formula 1>

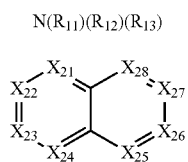  <Formula 2> wherein,
   $X_{21}$ is N (nitrogen atom) or $CR_{21}$, $X_{22}$ is N or $CR_{22}$, $X_{23}$ is N or $CR_{23}$, $X_{24}$ is N or $CR_{24}$, $X_{25}$ is N or $CR_{25}$, $X_{26}$ is N or $CR_{26}$, $X_{27}$ is N or $CR_{27}$, and $X_{28}$ is N or $CR_{28}$;

at least three of groups among $X_{21}$ to $X_{28}$ are selected as N; and $R_{21}$ to $R_{28}$ are each independently selected from hydrogen, a substituted or non-substituted $C_1$-$C_{60}$ alkyl, a substituted or non-substituted $C_3$-$C_{10}$ cycloalkyl, a substituted or non-substituted $C_6$-$C_{60}$ aryl, and a substituted or non-substituted $C_2$-$C_{60}$ heteroaryl.

2. The composition for preparing a graphene of claim 1, wherein the nitrogen-containing organic compound represented by Formula 2 is represented by the following Formula 2A:

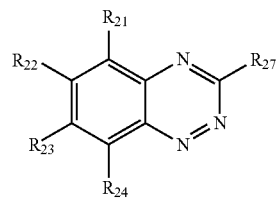  <Formula 2A> wherein in Formula 2A,
   $R_{21}$ to $R_{24}$ and $R_{27}$ are each independently selected from hydrogen, methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl; and methyl, ethyl, n-propyl, iso-propyl, n-butyl, sec-butyl, iso-butyl, tert-butyl, n-pentyl, cyclopentyl, cyclohexyl, phenyl, naphthyl, and pyridinyl which are substituted by at least one selected from the group consisting of deuterium, halogen atom, cyano, nitro, methyl, ethyl, n-propyl, iso-propyl, n-butyl, sec-butyl, iso-butyl, tert-butyl, phenyl, naphthyl, and pyridinyl.

3. The composition for preparing a graphene of claim 1, wherein the nitrogen-containing organic compound represented by Formula 2 is 1,2,4-benzotriazine.

4. The composition for preparing a graphene of claim 1, wherein the composition for preparing a graphene further comprises copper (I) ion or copper (II) ion.

5. The composition for preparing a graphene of claim 1, wherein the composition for preparing a graphene comprises about 0.2% by weight to about 3% by weight of the nitrogen-containing organic compound represented by Formula 2, about 1% by weight to about 5% by weight of the oxidizer, about 2% by weight to about 10% by weight of the acid, and a balance of a solvent.

6. The composition for preparing a graphene of claim 4, wherein the composition for preparing graphene comprises about 0.2% by weight to about 3% by weight of the nitrogen-containing organic compound, about 1% by weight to about 5% by weight of the oxidizer, about 2% by weight to about 10% by weight of the acid, about 0.1% by weight to about 1.0% by weight of the copper (I) ion or copper (II) ion, and a balance of a solvent.

7. A method for preparing a graphene comprising:
   doping a graphene with a composition for preparing a graphene to obtain a doped graphene, the composition for preparing a graphene comprising a nitrogen-containing organic compound represented by the following Formula 2; an oxidizer; and an acid, <Formula 1>

$N(R_{11})(R_{12})(R_{13})$

<Formula 2>

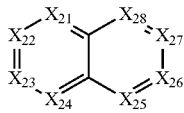

wherein, $X_{21}$ is N (nitrogen atom) or $CR_{21}$, $X_{22}$ is N or $CR_{22}$, $X_{23}$ is N or $CR_{23}$, $X_{24}$ is N or $CR_{24}$, $X_{25}$ is N or $CR_{25}$, $X_{26}$ is N or $CR_{26}$, $X_{27}$ is N or $CR_{27}$, and $X_{28}$ is N or $CR_{28}$;

at least three of groups among $X_{21}$ to $X_{28}$ are selected as N; and $R_{21}$ to $R_{28}$ are each independently selected from hydrogen, a substituted or non-substituted $C_1$-$C_{60}$ alkyl, a substituted or non-substituted $C_3$-$C_{10}$ cycloalkyl, a substituted or non-substituted $C_6$-$C_{60}$ aryl, and a substituted or non-substituted $C_2$-$C_{60}$ heteroaryl.

8. The method for preparing a graphene of claim 7, wherein the composition for preparing a graphene further comprises copper (I) ion or copper (II) ion.

9. A method for preparing a graphene comprising:

forming a graphene on at least one side of a metal catalyst; and removing the metal catalyst and doping the graphene at the same time by using a composition for preparing a graphene so as to obtain a doped graphene, the composition for preparing a graphene comprising a nitrogen-containing organic compound represented by the following Formula 2, an oxidizer, and an acid, <Formula 1>

$N(R_{11})(R_{12})(R_{13})$

<Formula 2>

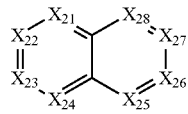

wherein, $X_{21}$ is N (nitrogen atom) or $CR_{21}$, $X_{22}$ is N or $CR_{22}$, $X_{23}$ is N or $CR_{23}$, $X_{24}$ is N or $CR_{24}$, $X_{25}$ is N or $CR_{25}$, $X_{26}$ is N or $CR_{26}$, $X_{27}$ is N or $CR_{27}$, and $X_{28}$ is N or $CR_{28}$;

at least three of groups among $X_{21}$ to $X_{28}$ are selected as N; and $R_{21}$ to $R_{28}$ are each independently selected from hydrogen, a substituted or non-substituted $C_1$-$C_{60}$ alkyl, a substituted or non-substituted $C_3$-$C_{10}$ cycloalkyl, a substituted or non-substituted $C_6$-$C_{60}$ aryl, and a substituted or non-substituted $C_2$-$C_{60}$ heteroaryl.

10. The method for preparing graphene of claim 9, wherein the composition for preparing a graphene further comprises copper (I) ion or copper (II) ion.

\* \* \* \* \*